United States Patent Office 3,849,397
Patented Nov. 19, 1974

3,849,397
3',5'-CYCLIC MONOPHOSPHATE NUCLEOSIDES
Roland K. Robins and Tasneem A. Khwaja, Santa Ana, Calif., assignors to International Chemical & Nuclear Corporation, Pasadena, Calif.
No Drawing. Filed Aug. 4, 1971, Ser. No. 169,095
Int. Cl. C07d 51/54
U.S. Cl. 260—211.5 R
18 Claims

ABSTRACT OF THE DISCLOSURE

An antiviral agent and intermediates for the production of such agent are disclosed having the formula

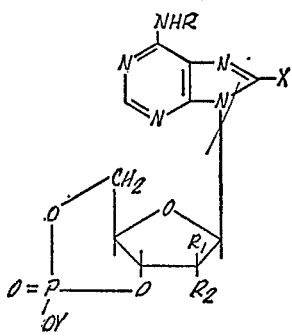

wherein X is H, OH, SH, a halogen or anhydro; R is H or acyl; $R_1$ is H or OH; $R_2$ is H or a good leaving group such as tosyl, mesyl, nisyl or brosyl; and Y is H, an alkali metal or ammonium. A process of preparing the antiviral agent is also disclosed.

BACKGROUND OF THE INVENTION

This invention relates generally as indicated to an antiviral agent and intermediate compounds produced during the synthesis of such agent, and also to a new synthesis process.

During the past decade, many nucleoside analogs have been found to exhibit good anti-tumor and antiviral activities. Among the presently known synthetic nucleosidic antiviral agents, the more important are generally considered to be 5'-odo-2'-deoxyuridine (IDU); 9-β-D-arabinofuransoyl adenine (Ara-A); and 1-β-D-arabinofuranosyl cytosine (Ara-C). Of these compounds, only IDU is commercially available specifically as an antiviral agent, and this compound has extremely low solubility, i.e., a maximum solubility of about 0.1 weight percent, and is also highly toxic. Ara-A presently is undergoing clinical testing as an antiviral agent, and while the reported evidence suggests that Ara-A is an effective agent against a spectrum of virus infections, its utility is severely limited by its low solubility, a maximum solubility of approximately one microgram per milliliter.

When nucleosidic analogs are used to inhibit either viral or tumor growth, the nucleosides are in vivo metabolized to their corresponding mono or poly phosphates, which are the actual inhibitors of such growth. The major obstacle in the use of nucleoside analogs in chemotherapy, however, has been the emergence of cellular resistance to such compounds, as the invasive cells exhibit a low level of kniase or pyrophosphorylase activity and consequently do not produce effective inhibitors. This problem, of course, could be overcome by utilizing nucleoside phosphates. Such derivatives, however, either fail to pass through the cellular membrane or are rapidly degraded in the intercellular fluid and thus are ineffective as inhibitors.

In view of the foregoing considerations, it is clearly desirable to have a nucleosidic analog which is capable of effectively inhibiting the development of virus infections and which also possesses superior solubility than presently known antiviral agents. The production of such a compound, however, is exceedingly difficult, since relatively few nucleosidic compounds are known which have demonstrated even slight antiviral activity. Moreover, to provide not only a compound having acceptable activity but which is also capable of penetrating the cellular membrane and contacting the virus infection in effective concentrations, complicates the difficulty in a multifold manner.

Nucleoside cyclic phosphates, due to their particular structure, might be capable of passing through the cellular membrane. There is no assurance, however, that such compounds, upon contacting the virus, would produce an effective inhibitor. For example, 3',5'-cyclic adenosine monophosphate of the following formula

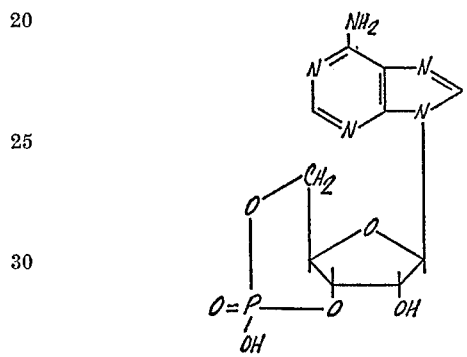

is a compound of nature having no known antiviral activity. By the same token, the intermediate compounds in the synthesis process of the present invention exhibit no antiviral activity. Quite surprisingly, however, the cyclic monophosphate nucleoside of this invention exhibits highly significant antiviral activity.

SUMMARY OF THE INVENTION

The present invention thus relates to an antiviral agent, intermediate compounds produced in the synthesis of such agent and the synthesis process. The compounds of this invention are of the following formula:

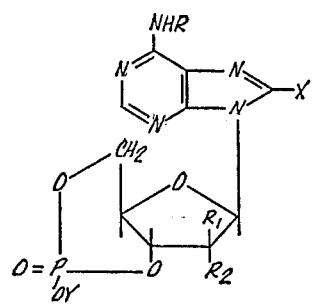

wherein X is H, OH, SH, a halogen or anhydro; R is H or acyl, $R_1$ is H or OH, $R_2$ is H or a leaving group such as tosyl; and Y is H, an alkali metal or ammonium. As will be understood from the description which follows, when $R_1$ is OH, R and $R_2$ are H, and X is H or SH; R is acyl only when X is OH, $R_1$ is H and $R_2$ is a leaving group; and X is a halogen only when R and $R_1$ are hydrogen and $R_2$ is a leaving group.

DETAILED DESCRIPTION OF THE INVENTION

The antiviral agent of the present invention is 9-β-D-arabinofuransoyl adenine-3',5'-cyclic monophosphate:

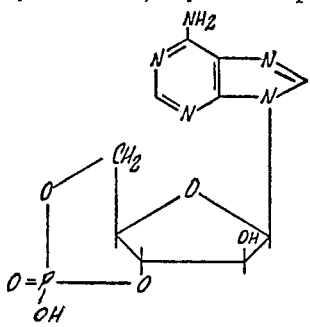

As will be seen from the illustrative examples which follow, this compound demonstrates significant antiviral activity *in vitro* against a broad spectrum of viruses including types 1 and 2 herpes simplex, vaccinia, myxoma and pseudorabies, at least as high as, and in some cases, significantly higher than Ara-A.

In synthesizing the antiviral agent, an efficient and comparatively staightforward process is used. In describing the process, not only in the general description but also in the illustrative examples, reference will be made to the following structural diagram, which outlines the sequence of steps of the synthesis process and simplifies the description and understanding of the same.

pound 3 is then subjected to a tosylation procedure to provide 2'-O-tosyl-8-bromoadenosine-3',5'-cyclic monophosphate (Compound 4). If a leaving group (LG) other than tosyl is attached to the 2' position, the resulting product, of course, will be the appropriate 2' compound, 2'-O-LG-8-bromoadenosine - 3',5' - cyclic monophosphate. Compound 4 is thereafter treated with a solution of acetic anhydride, sodium acetate and acetic acid to produce 2'-O-tosyl-6-N-acetyl - 8 - hydroxyladenosine-3',5'-cyclic monophosphate (Compound 5), which is then treated with methanolic ammonia in successive treatments to provide 2'-O-tosyl - 8 - hydroxyladenosine - 3',5' - cyclic monophasphate (Compound 6) and 8-2'-anhydro-8-oxy-9-β-D-arabinofuranosyl adenine-3',5'-cyclic monophosphate (Compound 7). Alternatively, Compound (6) may be obtained by treatment of Compound (4) with sodium acetate and acetic acid, and Compound (7) may also be obtained from Compound (6) by treatment with sodium and N,N-dimethylformamide (DMF). Compound 7 is subsequently treated with liquid hydrogen sulfide to produce 8-mercapto-9-β-D-arabinofuranosyl adenine-3',5'-cyclic monophosphate (Compound 8), which is then converted, preferably by reduction in the presence of Raney Nickel catalyst, to yield the desired 9-β-D-arabinofuranosyl adenine - 3',5' - cyclic monophosphate (Compound 2). Compound (8) may also be converted to Compound (2) by treatment with p.toluene sulfonyl

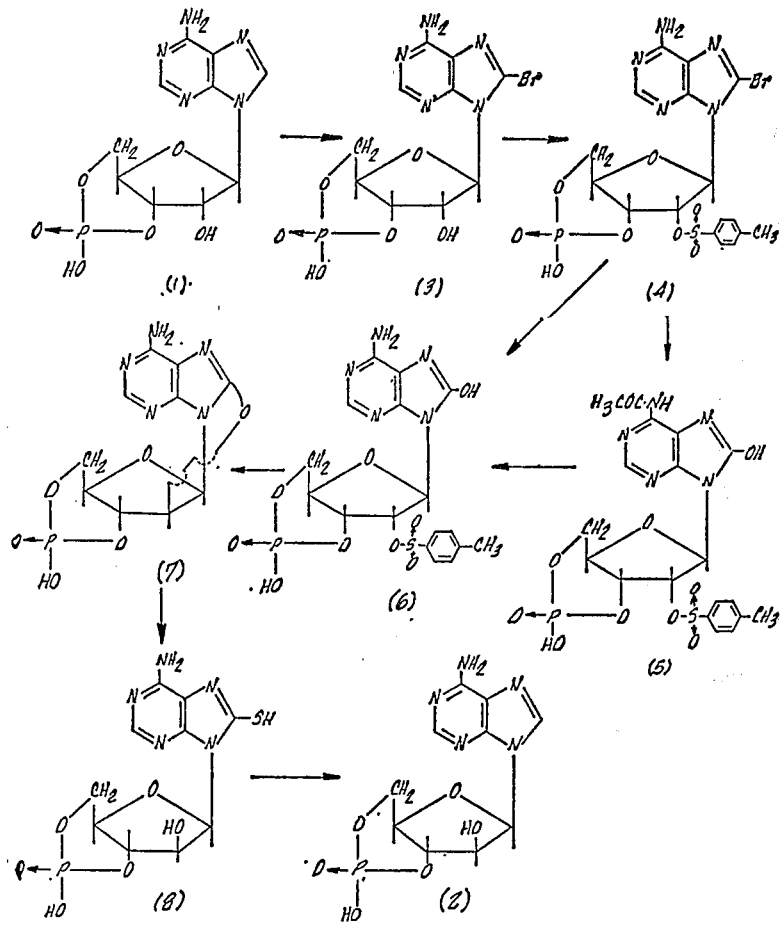

First, 3',5'-cyclic adenosine monophosphate (Compound 1), which is a naturally occurring compound, is brominated to produce 8-bromo-3',5'-cyclic adenosine monophosphate (Compound 3). Alternatively, Compound 3 may be obtained commercially from sources such as ICN Corporation. Regardless of whether it is synthesized as indicated or obtained commercially, Comchloride in pyridine or by oxidation with N-bromosuccinamide or iodine.

As will be appreciated by those skilled in the art, such method is comparatively simple and efficient and permits isolation of the intemediate compounds without the use of tedious column chromatographic procedures. By the same token, as can be seen from the examples which follow, good yields not only of the antiviral agent (Compound 2) but also of the intermediate compounds are obtained.

It will, of course, be understood that the previously noted substituents, X, R, and $R_2$, both in the foregoing general description and in the specific examples which follow, may be varied as indicated. Thus, X may be chloro, iodo or bromo in addition to bromo in Compound (3) and (4), R may be a $C_1$–$C_{10}$ acyl radical in Compound (5), and $R_2$ may be a good leaving group, that is a group readily susceptible to nucleophillic displacement other than tosyl in Compounds (4), (5), and (6). Generally, the leaving group will be tosyl, mesyl, anisyl, brosyl, nisyl or triisopropylbenzenesulfonyl, having the formula

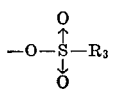

where $R_3$ is methyl,

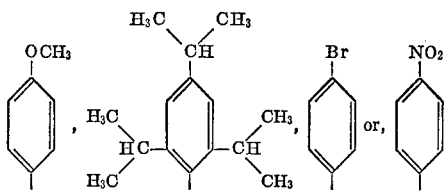

By the same token, when the substituents are changed, the appropriate processing step likewise will be changed; e.g., tosylation will be mesylation or brosylation, etc. Similarly, since the processing conditions for such steps are known, they will not be set forth herein, nor, for the sake of brevity of disclosure, will the invention description and illustrative examples be repeated utilizing the other compounds.

The invention will be better understood by reference to the following specific but illustrative examples. The ultraviolet spectra were recorded on a Cary-15 spectrophotometer, and infrared spectra were determined on a Perkin-Elmer Model 257–spectrophotometer. Proton magnetic resonance studies were carried out with a Hitachi Perkin-Elmer R–20A spectrometer with DSS as internal reference.

EXAMPLE I

Preparation of Sodium 2'-O-tosyl-8-bromoadenosine3',5'-cyclic phosphate (4)

Compound (3) (40.9 g., 100 mmoles) was dissolved in 1N NaOH (250 ml.) and to the stirred solution p.toluene sulfonyl chloride (76.26 g., 400 mmoles in 600 ml. dioxane) was added during a period of 15 minutes. The reaction solution was maintained at R.T. (with stirring) for 4 hours and the resulting mixture was poured over ice-water (5 l.) with strong stirring. The precipitated material was filtered, washed with ice-cold water (2 l.) and dried under suction. The dried precipitate was suspended in chloroform (800 ml.), stirred vigorously, and filtered and finally washed with excess of chloroform (3 l.) The white powdery residue was dried in a vacuum desiccator over $P_2O_5$ overnight to obtain 55.6 g. (94%) of (4) as a chromatographically homogenous material. IR spectrum showed a strong band at 1179 cm.$^{-1}$ corresponding to the aryl sulfonyl absorption. In the PMR spectrum the anomeric proton (determined on $D_2O$) was centered at δ5.82 as a singlet. On paper electrophoresis in phophate buffer (pH 7.2) it moved with single charge like cyclic-AMP. Ultraviolet absorption:

$\lambda_{max.}^{H_2O}$ 266 (ϵ 15,100), $\lambda_{max.}^{pH 1}$ 264 (ϵ 17,700), $\lambda_{max.}^{pH 11}$ 266 (ϵ 15,200)

EXAMPLE II

Preparation of 8,2'-anhydro-8-oxy-9-β-D-arabinofuranosyladenine-3',5'-cyclic phosphate (7)

(a) Sodium 2'-O-tosyl-6-N-acetyl-8-hydroxyladenosine-3',5'-cyclic phosphate (5)

Sodium acetate (32.8 g.) was dissolved in acetic acid (800 ml.) followed by addition of acetic anhydride (80 ml.) and (4) (24.00 g., 40 mmoles). The solution was kept under reflux (absence of moisture) for 3.75 hours (bath temp. 125° C.), the reaction mixture was cooled and evaporated to dryness under reduced pressure. The residue was evaporated by MeOH, EtOH and dioxane to remove last traces of acetic acid and then suspended in a mixture of MeOH (600 ml.) and EtOH (400 ml.). The solid lumps in suspension were broken and the precipitated material filtered (200 ml. MeOH was used for washing). The dried material (5) gave one homogenous spot on chromatography in several systems; yield 22.61 g. Ultraviolet absorption:

$\lambda_{max.}^{pH 1}$ 290, $\lambda_{max.}^{pH 11}$ 272.5 and 309,5 μ.

(b) Ammonium 2'-O-tosyl-8-hydroxyladenosine 3',5'-cyclic phosphate (6)

Compound (5) (2, 168 g., 4 mmoles) as obtained in the last step was dissolved in methanolic ammonia (60 ml.) and the solution left at R.T. for 90 hours. Then the solution was evaporated under reduced pressure to dryness. The residue was suspended and titurated with EtOH (40 ml.) and left in refrigerator overnight. Next morning the precipitated material was filtered, washed with EtOH (20 ml.) and dried to obtain 1.7 g. of (6). The filtrate and the washings were evaporated under reduced pressure and the residue was crystallized from MeOH/EtOH to obtain another 0.065 g. of (6); total yield 1.765 g. (85.3%). Ultraviolet absorption:

$\lambda_{max.}^{H^+}$ 265 and 288 μ, $\lambda_{max.}^{OH^-}$ 282 μ.

(c) 8-2'-anhydro-8-oxy-9-β-D-arabinofuranosyladenine-3',5'-cyclic phosphate (7)

Method I: Compound (6) (1.551 g., 3 mmoles) was dissolved in methanolic ammonia (50 ml.) and the solution maintained in a bomb for 6 hours at 80° C. The reaction products were adsorbed on a silica acid column (Mallinckrodt-100 mesh, 2.7 cm. x 70 cm.). The column was eluted with chloroform (400 ml.), followed by MeOH/chloroform (1/1, volume/volume). The product (7) appeared in the second major peak and the corresponding fractions were collected and evaporated. The residue was dissolved in MeOH (40 ml.) and cooled to obtain (7) as crystalline ammonium salt. The product was filtered (0.44 g.) and the filtrate acidified with 2N and HCl to approx. pH 2 when another crop of (7) (0.16 g.) was obtained as free acid; total yield 0.60 g., 59.3%.

Analysis: $C_{10}H_{10}N_5O_6P$ requires C, 36.71; H, 3.08; N, 21.40%. Found: C, 36.85; and H, 3.13 and N, 21.22%. IR spectrum showed no absorption band corresponding to an aryl sulfonyl group at 1179 cm.$^{-1}$. In the PMR spectrum (determined in DMSO/NaOD) the anomeric proton appeared as a doublet centered at δ6.5 indicating an arabinose configuration of the 2'-anhydro linkage. The 2'-proton was a triplet located at δ5.95. Ultraviolet absorption:

$\lambda_{max.}^{H^+}$ 259 and 286 (sh), $\lambda_{max.}^{OH^-}$ 257 μ.

Method II: Compound (7) 17.12 g. (33.1 mmoles) was dissolved in methanolic ammonia (200 ml.) in a stainless steel bomb and the bomb was heated at 75° C. for 9 hours. The reaction contents were cooled and evaporated to dryness under reduced pressure. The residue was dissolved in water (80 ml.) and filtered. The filtrate was mixed with EtOH (80 ml.) and acidified with 2N HCl (pH <2) and left in refrigerator overnight. It was filtered, washed with MeOH/EtOH (50%, 2× 35 ml.) and dried to obtain 5.09 g. of (7) (47.01%). The compound was identical to that obtained with the Method I.

EXAMPLE III

Preparation of 8-mercapto-9-β-D-arabinofuranosyladenine-3',5'-cyclic phosphate (8)

Method I: Compound (7) (1.30 g., 4 mmoles) was suspended in DMF (15 ml.), and pyridine (2 ml.) followed by liquid $H_2S$ (40 ml.) in a bomb. The contents were kept at 100° C. (bath temp.) for 16 hours, cooled and then evaporated to dryness under vacuum. The residue was absorbed on a silica acid (Mallinckrodt-100 mesh) column (5 x 40 cm.). The column was eluted with chloroform (950 ml.), followed by a mixture of chloroform and MeOH (1/1, volume/volume). There were two major UV-absorbing peaks, the fractions corresponding to the first peak were collected and evaporated to obtain 0.9 g. of white powder (8), recrystallized from MeOH/EtOH to obtain 0.835 g. (57.7%) in three different crops. A portion was dissolved in water and aqueous solution acidified to pH 2 to obtain crystalline free acid of (8) and dried at 80° for 4 hours under vacuum.

Analysis: $C_{10}H_{12}N_5O_6PS \cdot H_2O$ requires C, 31.60; H, 3.72; N, 18.46%. Found: C, 31.44; H, 3.48; N, 18.34%. Ultraviolet absorption:

$\lambda_{max.}^{pH\,1}$ 244 (ε 10,620) and 308 μ (ε 26,170), $\lambda_{max.}^{pH\,11}$ 294 μ (ε 23,970).

PMR (in $D_2O$) showed the anomeric protion as a characteristic doublet centered at δ7.0.

Method II: Compound (7) (7.7 g., 23.3 mmoles) was suspended in DMF (110 ml.) in a stainless steel bomb followed by addition of liquid $H_2S$ (55 ml.) in the absence of moisture. The reaction contents were maintained at 110° C. for 20 hours, cooled and then the precipitated residue was filtered with the help of EtOH (100 ml.), washed with ether (100 ml.) and dried under suction to obtain almost pure (8) as a white powdery material (5.39 g.). The product was dissolved in $H_2O$ (30 ml.) and filtered. To the filtrate EtOH (30 ml.) was added followed by acidification with 2N HCl (pH<2) and the precipitated (8) was kept at R.T. for one hour and then filtered. The precipitate was washed with aqueous EtOH (5 ml, 50%) and then dried at 60° C. (0.1 mm. pressure) for 4 hours to obtain 3.85 g. of chromatographically homogenous (8). The filtrate on further acidification gave another crop of 0.20 g.

The original filtrate from the reaction mixture and the washings were mixed, evaporated and absorbed on a dry silicic acid column (4.5 x 18.0 cm.). The column was eluted with 50% methanolic chloroform (150 ml.), followed by 10% methanolic ammonia (10 ml. fractions were collected). The fraction corresponding to pure (8) were collected, evaporated and the residue was dissolved in MeOH with the help of 2N $NH_4OH$ and precipitated by acidification to obtain 1.3 g. of pure (8). Total yield 5.15 g., 61.2%.

EXAMPLE IV

Preparation of 9-β-D-arabinofuranosyladenine-3',5'-cyclic phosphate (2)

Compound (8) (3.04 g, 8 mmoles) was dissolved in MeOH (250 ml.) containing 10 ml. $NH_4OH$ (2N). To the solution Raney Nickel catalyst (36 g. wet weight) was added and the mixture was maintained under reflux (bath temp. 75° C.) for 18 hours. Then the catalyst was filtered through a celite pad, washed with MeOH (100 ml. containing 10 ml. 2N $NH_4OH$). The filtrate and the washings were evaporated to dryness and the residue was dissolved in MeOH (30 ml.) and a few drops of 2N $NH_4OH$. The solution was filtered and acidified when (2) precipitated as free acid (2.05 g.). The filtrate on concentration gave another crop of 0.24 g.; total yield: 2.24 g. (81%). It was recrystallized by dissolving in water and acidification and dried at 80° for 4 hours (1 mm. pressure).

Analysis: $C_{10}H_{12}O_6N_5P$ requires C, 36.48; H, 3.67 and N, 21.09%. Found: C, 36.20; H, 3.52; N, 21.27%. Ultraviolet absorption:

$\lambda_{max.}^{pH\,1}$ 256 (ε 15,200), $\lambda_{max.}^{pH\,11}$ 258 μ (ε 15,400)

EXAMPLE V

The antiviral agent of this invention was tested for activity by the virus rating (VR) method of Sidwell et al., Proc. Soc. Exp. Biol. Med. 131, 1223–30 (1969) modified in that but one virus level is employed with varying numbers of cups per level so that virus activity is determined by dividing the total adjusted "C–T" by the number of cups employed at each level and further dividing that result by 10. "C–T" for a particular level is the remainder resulting from substraction of the cytopathic effect of treated cells from that of untreated but infected controls. If toxicity is seen at that level, the "C–T" is "adjusted" by division by 2. A virus rating (VR) greater than 1 is indicative of definite antiviral activity, a VR of 0.5 to 0.9 is indicative of moderate antiviral activity, while a VR less than 0.5 suggests slight or no apparent antiviral activity.

In the antiviral experiments, the antiviral agent (Compound 2), ammonium salt, was dissolved in a cell culture medium consisting of vitamins, amino acids, serum, buffer, penicillin, streptomycin and indicator dye in water. The virus suspended in the cell culture medium was added to an established monolayer of KB or RK13 cells, and an equal volume of the antiviral agent was then added within 15 minutes. The infected treated cells were incubated three days, and the degree of viral cytopathogenic effect (CPE) on the cells was graded following microscopic examination. Controls for each experiment included cell controls (cells and cell culture medium only), virus controls (cells and virus and cell culture medium), and toxicity controls (cells and chemical and cell culture medium).

Of the viruses employed in the antiviral experiments, herpes type 1 is implicated in labialis (cold sores), herpes keratitis, and herpes encephalitis, while herpes type 2 causes herpes genitalis, a common and communicable form of venereal disease. Myxoma causes death in domestic and wild rabbits, preceded by respiratory illness and severe swelling. Pseudorabies causes infectious bulbar paralysis, also referred to as the "mad itch" disease in cattle, sheep, pigs, dogs, and mink. Vaccinia is an avirulent form of smallpox virus employed for smallpox vaccination, which occasionally results in undesired side effects.

The results of the antiviral experiments are set forth in Tables 1 and 3 through 6 which follow. In Table 2, results of a typical antiviral experiment with Ara-A are shown for comparative purposes. Tables 3 through 6 also include the comparable viral rating of Ara-A.

TABLE 1

[Effect of 9-β-D-arabinofuranosyladenine-3',5'-cyclic phosphate on Type 1 Herpes simplex virus in cell culture]

| Experiment §1 [1] Virus dose: 320 cell culture 50% infection doses ($CCID_{50}$)/ml. | | | Experiment §2 [2] Virus dose: 320 $CCID_{50}$/ml. | | |
|---|---|---|---|---|---|
| Conc. of compd. (μg./ml.) | Toxicity to KB cells | Inhibition of virus CPE, percent | Conc. of compd. (μg./ml.) | Toxicity to KB cells | Inhibition of virus CPE, percent |
| 1,000 | Sl. toxic | 100 | 1,000 | Sl. toxic | 100 |
| 320 | do | 86 | 320 | do | 100 |
| 100 | Very sl. toxic. | 86 | 100 | Very sl. toxic. | 100 |
| 32 | Nontoxic | 86 | 32 | Nontoxic | 88 |
| 10 | do | 73 | 10 | do | 64 |
| 3.2 | do | 67 | 3.2 | do | 0 |
| 1.0 | do | 26 | 1.0 | do | 0 |

[1] Virus Rating (VR)=1.4.   [2] VR=1.1.

TABLE 2

Effect of an accepted active compound, 9-β-D-arabinofuranosyladenine (Ara-A) on Type 1 Herpes simplex virus in cell culture. Virus dose: 320 $CCID_{50}/ml$.]

| Conc. of compd. (μg./ml.) | Toxicity to KB cells | Inhibition of virus CPE, percent |
|---|---|---|
| 1,000 | Toxic | |
| 320 | Sl. toxic | 100 |
| 100 | Very sl. toxic | 100 |
| 32 | Nontoxic | 82 |
| 10 | do | 70 |
| 3.2 | do | 30 |
| 1.0 | do | 0 |

NOTE.—VR=1.0

TABLE 3

Effect of 9-β-D-arabinofuranosyladenine-3',5'-cyclic phosphate on Type 2 Herpes simplex virus in cell culture. Virus dose: 320 $CCID_{50}/ml$.]

| Conc. of compd. (μg./ml.) | Toxicity to KB cells | Inhibition of virus CPE, percent |
|---|---|---|
| 1,000 | Sl. toxic | 100 |
| 320 | do | 100 |
| 100 | do | 100 |
| 32 | Very sl. toxic | 88 |
| 30 | Nontoxic | 62 |
| 1.2 | do | 38 |
| 3.0 | do | 0 |

NOTE.—VR=1.2; Ara-A VR=0.7.

TABLE 4

Effect of 9-β-D-arabinofuranosyladenine-3',5'-cyclic phosphate on vaccinia virus in cell culture. Virus dose: 320 $CCID_{50}/ml$.]

| Conc. of compd. (μg./ml.) | Toxicity to KB cells | Inhibition of virus CPE, percent |
|---|---|---|
| 1,000 | Sl. toxic | 100 |
| 120 | do | 100 |
| 100 | do | 94 |
| 32 | do | 88 |
| 10 | Nontoxic | 62 |
| 3.2 | do | 6 |
| 1.0 | do | 0 |

NOTE.—VR=0.9; Ara-A=0.9.

TABLE 5

Effect of 9-β-D-arabinofuranosyladenine-3',5'-cyclic phosphate on Myxoma virus in cell culture. Virus dose: 10 $CCID_{50}/ml$.]

| Conc. of compd. (μg./ml.) | Toxicity to KB cells | Inhibition of virus CPE, percent |
|---|---|---|
| 1,000 | Toxic | |
| 320 | Sl. toxic | 100 |
| 100 | do | 100 |
| 32 | Very sl. toxic | 100 |
| 10 | Nontoxic | 41 |
| 3.2 | do | 16 |
| 1.0 | do | 0 |

NOTE.—VR=0.5; Ara-A=0.8.

TABLE 6

[Effects of 9β-D-arabinofuranosyladenine-3',5'-cyclic phosphate on pseudorabies virus in cell culture. Virus dose: 32 $CCID_{50}/ml$.]

| Conc. of compd. (μg./ml.) | Toxicity to RK13 cells | Inhibition of virus CPE, percent |
|---|---|---|
| 1,000 | Toxic | |
| 320 | Sl. toxic | 100 |
| 100 | Very sl. toxic | 100 |
| 32 | Nontoxic | 37 |
| 10 | do | 6 |
| 3.2 | do | 0 |
| 1.0 | do | 0 |

NOTE.—VR=0.5; Ara-A VR=0.6.

For additional comparisons, appropriate antiviral activity data for 5-iodo-2'-deoxyuridine (IDU) and 1-β-D-arabinofuranosyl cytosine (Ara-C) are shown in Table 7.

TABLE 7

|  | 5-iodo-2'-deoxyuridine (IDU) | 1-β-D-arabinofuranosyl cytosine (Ara-C) |
|---|---|---|
| Type 1-Herpes-Simplex | 1.0–1.4 | 1.1, 1.2 |
| Type 2-Herpes-Simplex | 1.8 | 0.8 |
| Pseudorabies | 0.6 | 0.4 |
| Vaccinia | 1.3 | 0.8 |
| Myxoma | 0.8 | 0.6 |

NOTE.—Cell toxicity: 10 micrograms/milliliter; 1.0 micrograms/milliliter. Very insoluble (0.1% maximum solubility); Soluble at 2,000 mg./ml.

It will be appreciated from the foregoing results that the antiviral agent of the present invention demonstrates *in vitro* activity at least as high as and in the case of herpes types 1 and 2 viruses, significantly higher than Ara-A. By the same token, such activity is comparable to or better than that of either IDU or Ara-C. In addition 9-β-D-arabinofuranosyladenine - 3',5' - cyclic monophosphate has the definite advantage of being soluble in aqueous solution to a vastly greater extent than Ara-A or IDU, thus allowing for more uniform preparations and better penetration and adsorption by body tissues.

EXAMPLE VI

In the following example, the *in vivo* antiviral activity of 9-β-D arabinofuranosyladenine-3',5'-cyclic monophosphate was determined. In all three experiments, very lethal infections of herpes and vaccinia viruses were used, and the agent demonstrated definite activity, as will be seen from Table 8. In experiment 4, comparative data for Ara-A indicates that Ara-A was considerably less active than the antiviral agent of this invention against vaccinia virus. Also, Ara-A is very insoluble, which made it extremely difficult to inoculate the animals.

The following is the protocol for each experiment:

Expt. 1: 24–26 gram male Swiss-Webster mice were inoculated intracerebrally (i.c.) with 0.03 ml. of the ammonium salt of Compound (2) dissolved in sterile saline, or with sterile saline only. The dose was 40 mg./kg., which was approximately the maximum dose which could be tolerated by the mice. Twenty-four hours later, the animals were inoculated i.c. with 40 50% lethal doses (40 $LD_{50}$) of vaccinia virus (WR strain). The animals were then observed daily for 14 days and the mortality recorded. Antiviral activity was indicated if the drug-treated animal survival number or mean survival time was greater than that of those infected animals treated with saline only.

Expt. 2: This experiment was identical to Expt. 1 except that the infected mice were treated with Compound (2) or saline 6 hours after the virus inoculation.

Expt. 3: In this experiment, mice were inoculated i.c. with 10 $LD_{50}$ of type 1 herpes simplex virus (strain 123) and 6 hours later were treated i.c. with 40 mg./kg. of Compound (2) or saline. The animals were again observed daily for 14 days.

Expt. 4: An experiment similar to Expt. 2 above was carried out with 100 mg./kg. of Ara-A. This dose of Ara-A was moderately toxic to the mice, killing 3 of 6 control animals.

TABLE 8

[In vivo antiviral activity of 9-β-D-arabinofuranosyladenine-3',5'-cyclic phosphate]

| | Survivors/total | Survivor, p¹ | Mean survival time of mice dying on or before day 14 | Mean survival increase, p² |
|---|---|---|---|---|
| Expt. 1: | | | | |
| Vaccinia virus+saline | 0/10 | | 5.7 | |
| Vaccinia virus+Compound (2) | 3/9 | <0.3 | 7.3 | <0.05 |
| Expt. 2: | | | | |
| Vaccinia virus+saline | 0/10 | | 5.7 | |
| Vaccinia virus+Compound (2) | 6/10 | <0.05 | 10.7 | <0.01 |
| Expt. 3: | | | | |
| Herpes virus+saline | 0/10 | | 9.5 | |
| Herpes virus+Compound (2) | 9/10 | <0.01 | >11.0 | <0.05 |
| Expt. 4: | | | | |
| Vaccinia virus+saline | 2/20 | | 4.3 | |
| Vaccinia virus+Ara-A | 0/4 | | 7.0 | <0.05 |

¹ P=Probability that any increase in the number of survivors in the virus-infected, treated groups compared to the saline-treated group was due to chance, as determined by the chi square analysis. P<0.3=significant; P<0.05=highly significant.

² P=Probability that any observed increase in mean survival time of virus-infected, treated groups compared to the saline-treated groups was due to chance, as determined by t test. P<0.05=significant; P<0.01=highly significant.

When the antiviral agent of this invention is used, it is applied in aqueous solution containing from approximately 0.025 to about 10 weight percent of the agent, based on the total weight of the solution. For injection with animals, it is used as a physiological saline solution containing about 10 to about 250 milligrams of the agent per milliliter of solution. For oral use in tablet or capsule form, about 5 to about 500 milligrams/tablet or capsule will be used. The capsules will be the usual gelatin capsules and will contain in addition to the antiviral agent, a small quantity, e.g., less than 5% by weight, preferably less than 1%, magnesium stearate or other flowing agent, such as "Avicel" (carboxy methylcellulose). Tablets will include the antiviral agent and a binder such as a gelatin solution, a starch paste in water, polyvinyl pyrrilidone, polyvinyl alcohol in water, etc., with a typical sugar coating. If used as an oral solution, about 10 to about 50 milligrams of the agent will be used per milliliter of aqueous solution, which may also contain small quantities of typical coloring and/or flavoring agents. For topical use on the eye or skin, it will be used as an aqueous solution containing, in addition to the indicated quantity of the agent, up to approximately 1.4 weight percent of polyvinylalcohol, or in a cream, in a petrolatum base ointment containing sorbitan monolaurate and water with methyl and propyl parabens added as preservatives, or in a plasticized hydrocarbon gel, such as that available from E. R. Squibb under the trade name "Plastibase" (a polyethylene and mineral oil gel base), containing from about 0.025 to about 10 weight of the antiviral agent. The exact quantity of the antiviral agent to be used in any given case will, of course, vary within the indicated ranges depending upon numerous factors such as the extent of and type of the virus infection, etc. In any event, the selection of the proper quantity will be readily made by those skilled in the art.

What is claimed is:

1. A compound of the formula:

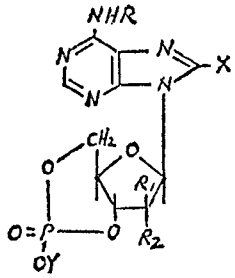

wherein X is H, a halogen, OH or SH; R is H or a $C_1$ to $C_{10}$ acyl radical; $R_1$ is H or OH; $R_2$ is H or a leaving group selected from the group consisting of tosyl, mesyl, anisyl, brosyl, nisyl, or triisopropylbenzenesulfonyl; and Y is H, an alkali metal or ammonium; provided that when $R_1$ is OH, R and $R_2$ are H, and X is H or SH; R is acyl only when X is OH, $R_1$ is H and $R_2$ is a leaving group; and X is a halogen only when R and $R_1$ are H, and $R_2$ is a leaving group.

2. The compound of Claim 1 in which X is H, R and $R_2$ are H and $R_1$ is OH.

3. The compound of Claim 1 wherein X is a halogen, R and $R_1$ are H, and $R_2$ is a leaving group.

4. The compound of Claim 3 in which X is bromo, R and $R_1$ are H, and $R_2$ is tosyl.

5. The compound of Claim 1 in which X is OH, R is acyl, $R_1$ is H and $R_2$ is a leaving group.

6. The compound of Claim 5 in which X is OH, R is acetyl, $R_1$ is H and $R_2$ is tosyl.

7. The compound of Claim 1 wherein X is OH, R and $R_1$ are H, and $R_2$ is a leaving group.

8. The compound of Claim 7 in which X is OH, R and $R_1$ are H, and $R_2$ is a leaving group having the structure

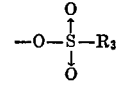

wherein $R_3$ is methyl,

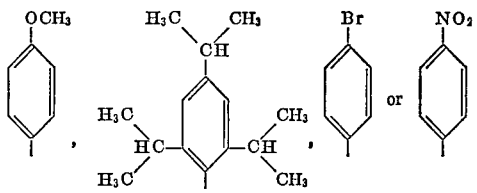

9. The compound of Claim 1 in which X is OH, R and $R_1$ are H, and $R_2$ is tosyl.

10. The compound of Claim 1 wherein X is SH, R and $R_2$ are H, and $R_1$ is OH.

11. A process of preparing 9-β-D-arabinofuranosyladenine-3',5' - cyclic monophosphate comprising treating 8-halo-3',5'-cyclic adenosine monophosphate to attach a 2' leaving group thereto; treating said 2' compound thus produced with a solution comprising acetic acid and sodium acetate to produce 2'-O-LG-8-hydroxyladenosine-3',5'-cyclic monophosphate; wherein L.G. is a leaving group; thereafter treating said hydroxyladenosine compound to produce 8-2'-anhydro-8-oxy - 9-β-D-arabinofuranosyladenine-3',5'-cyclic monophosphate; treating said anhydro compound with liquid hydrogen sulfide to provide 8-mercapto-9-β-D-arabinofuranosyladenine-3',5' - cyclic monophosphate; and subsequently converting said mercapto compound to said 9-β-D-arabinofuranosyladenine-3',5'-cyclic monophosphate.

12. The process of Claim 11 in which said solution of acetic acid and sodium acetate includes acetic anhydride and 2'-O-LG-6-N-acetyl-8-hydroxyladenosine-3',5'-cyclic monophosphate is produced which is thereafter treated with methanolic ammonia to produce said anhydro compound.

13. The process of Claim 11 in which said 8-mercapto compound is converted to said 9-β-D-arabinofuranosyladenine-3',5'-cyclic monophosphate by reduction in the presence of Raney Nickel catalyst.

14. A process of preparing 9-β-D-arabinofuranosyladenine-3',5'-cyclic monophosphate comprising tosylating 8-bromo-3',5'-cyclic adenosine monophosphate to produce 2'-O-tosyl-8-bromoadenosine-3',5'-cyclic monophosphate; treating said 2' tosylate with a solution of acetic acid, sodium acetate and acetic anhydride to produce 2'-O-tosyl-6-N-acetyl-8-hydroxyladenosine - 3',5' - cyclic monophosphate; thereafter treating said 2'-O-tosyl-6-N-acetyl-8-hydroxyladenosine-3',5'-cyclic monophosphate with a solution of methanolic ammonia to produce 8-2'-anhydro-8-oxy-9-β-D-arabinofuranosyladenine-3',5'-cyclic monophosphate; treating said anhydro arabinofuranosyladenine-3', 5'-cyclic monophosphate with liquid hydrogen sulfide to provide 8-mercapto-9-β-D-arabinofuranosyladenine-3',5'-cyclic monophosphate; and subsequently converting said mercapto arabinofuranosyladenine, 3',5'-cyclic monophosphate to said 9-β-D-arabinofuranosyladenine-3',5'-cyclic monophosphate.

15. The process of Claim 14 in which said treatment with methanolic ammonia includes two successive treatments therewith, said first treatment producing 2'-O-tosyl-8-hydroxyladenosine-3',5'-cyclic monophosphate, and said second treatment with methanolic ammonia providing said 8-2'-anhydro-8-oxy - 9 - β-D-arabinofuranosyladenine-3', 5'-cyclic monophosphate.

16. The process of Claim 14 in which said 8-mercapto compound is converted by reduction in the presence of a Raney Nickel catalyst.

17. The compound of Claim 1 wherein R is a $C_1$ to $C_{10}$ acyl radical.

18. The compound 8,2'-anhydro-8-oxy-9-β-D-arabinofuranosyladenine-3',5'-cyclic phosphate.

References Cited
UNITED STATES PATENTS 3,712,885    1/1973    Weimann et al. __ 260—211.5 R JOHNNIE R. BROWN, Primary Examiner U.S. Cl. X.R.

424—180